(12) United States Patent
Ono

(10) Patent No.: US 6,928,486 B2
(45) Date of Patent: Aug. 9, 2005

(54) PORTABLE RADIO COMMUNICATION TERMINAL HAVING EXPRESSION STYLE PROCESSING APPARATUS THEREIN AND EXPRESS STYLE METHOD

(75) Inventor: Hiroshi Ono, Tokyo (JP)

(73) Assignee: NEC Corporation, Tokyo (JP)

(*) Notice: Subject to any disclaimer, the term of this patent is extended or adjusted under 35 U.S.C. 154(b) by 541 days.

(21) Appl. No.: 09/736,575

(22) Filed: Dec. 15, 2000

(65) Prior Publication Data

US 2001/0015731 A1 Aug. 23, 2001

(30) Foreign Application Priority Data

Dec. 16, 1999 (JP) ............................................ 11-357296

(51) Int. Cl.[7] .............................................. G06F 15/16
(52) U.S. Cl. .............................. 709/246; 704/2; 704/3; 704/8
(58) Field of Search ................................. 709/246, 231, 709/235, 238; 704/2, 3, 8; 707/500, 501, 502, 515, 516, 517, 2, 3, 8

(56) References Cited

U.S. PATENT DOCUMENTS

| | | | | |
|---|---|---|---|---|
| 5,930,341 A | * | 7/1999 | Cardillo et al. ........... | 379/93.25 |
| 5,930,472 A | * | 7/1999 | Smith ......................... | 709/203 |
| 6,054,990 A | * | 4/2000 | Tran ........................... | 345/863 |
| 6,073,136 A | * | 6/2000 | Bertram et al. ........... | 707/104.1 |
| 6,081,629 A | * | 6/2000 | Browning ................... | 382/313 |
| 6,161,124 A | | 12/2000 | Takagawa et al. | |
| 6,185,625 B1 | * | 2/2001 | Tso et al. .................... | 709/247 |
| 6,247,048 B1 | * | 6/2001 | Greer et al. ................ | 709/219 |
| 6,374,305 B1 | * | 4/2002 | Gupta et al. ................ | 709/246 |
| 6,470,381 B2 | * | 10/2002 | De Boor et al. ............ | 709/217 |
| 6,473,609 B1 | * | 10/2002 | Schwartz et al. ........... | 455/406 |
| 6,538,673 B1 | * | 3/2003 | Maslov ....................... | 345/853 |
| 6,557,029 B2 | * | 4/2003 | Szymansky ................. | 709/206 |

FOREIGN PATENT DOCUMENTS

| | | |
|---|---|---|
| CN | 1222009 A | 7/1999 |
| EP | 0 953 901 A2 | 4/1999 |
| JP | 9-223062 A | 8/1997 |
| JP | 9-223062 | 8/1997 |
| JP | 10-133988 A | 5/1998 |
| JP | 10-222508 | 8/1998 |
| JP | 11-96144 | 4/1999 |
| JP | 11-237865 A | 8/1999 |
| JP | 11-238053 | 8/1999 |
| WO | WO 99/52032 A1 | 10/1999 |

* cited by examiner

Primary Examiner—Saleh Najjar
(74) Attorney, Agent, or Firm—Foley & Lardner LLP

(57) ABSTRACT

In an expression style processing method, a plurality of objects are stored. An expression style format for expressing the stored objects is generated. The generated expression style format is stored. A portable radio communication terminal is also disclosed.

32 Claims, 18 Drawing Sheets

PORTABLE RADIO COMMUNICATION TERMINAL HAVING EXPRESSION STYLE PROCESSING APPARATUS THEREIN AND EXPRESS STYLE METHOD

BACKGROUND OF THE INVENTION

The present invention relates to a portable radio communication terminal and expression style processing method and, more particularly, to a portable radio communication terminal which generates and edits an expression style format for expressing image data or character data in a desired format, and an expression style processing method.

Recent portable radio communication terminals receive multimedia contents including various kinds of digital data such as character data, image data, and voice data from an information providing system such as home pages on the Internet and display the contents. A content of this type is expressed using an expression style format formed from a description language such as the HTML (HyperText Markup Language) or step SMIL (Synchronized Multimedia Integration Language). A portable radio communication terminal displays a multimedia content on the basis of this expression style format. Processing of such an expression style format is called style processing.

Style processing in a conventional portable radio communication terminal will be described below with reference to FIG. 16. Referring to FIG. 16, a conventional portable radio communication terminal comprises a radio section 108 for performing radio communication with the radio base station of a portable telephone system, a transmission/reception data processing section 109 for executing communication protocol processing for radio communication, a display processing section 113 for executing display processing of character/image data, a display device 114 for displaying display data from the display processing section 113, a description language memory 116 for storing a description language such as the HTML or XML (extensible Markup Language), an image memory 117 for storing image data, a voice data memory 125 for storing voice data, a voice playback processing section 123 for executing voice playback processing, a speaker 124 for converting the output from the voice playback processing section 123 to an audible signal, and a CPU (Central Processing Unit) 126 for controlling the entire portable radio communication terminal.

FIG. 17 shows style processing by the portable radio communication terminal shown in FIG. 16. Object acquisition operation and display operation will be described. Referring to FIG. 17, in accordance with an instruction for download from a home page or file server by user operation (step S201), when the target of the download instruction is voice data, the designated voice data is downloaded (step S202) and stored in the voice data memory 125 (step S203). When the target of the download instruction is image data, the designated image data is downloaded (step S204) and stored in the image memory 117 (step S205).

When the target of the download instruction is a description language, the designated description language is downloaded (step S206) and stored in the description language memory 116 (step S207), and then, the description language is analyzed (step S208). After the end of the download instruction by user operation, if the description language is a description language with style such as the HTML style sheet or step SMIL, the character/image data is displayed on the display device 114, and the voice data is processed by the voice playback processing section 123 and played back from the speaker 124 (step S209).

However, the above-described conventional portable radio communication terminal executes only simple style processing and therefore has the following problem.

As the first problem, since the style designation is fixed by the content provider, the user of the portable radio communication terminal cannot freely generate a content. As the second problem, since an operation of automatically browsing a content without style designation in the terminal is impossible, the same user operation is required to reconstruct the same content, resulting in cumbersomeness. As the third problem, since a plurality of image data are separately prepared and synthesized by style description for every display, this scheme is unsuitable for a portable radio communication terminal with a limited memory.

As a method of customizing the service providing method, a technique of issuing an instruction from a portable radio communication terminal to a server is disclosed in Japanese Patent Laid-Open No. 9-223062. However, according to this method, customization must be instructed from the terminal to the server every time, and the user cannot customize the service providing method by operating only the portable radio terminal.

Techniques of generating a content having a desired layout using a relatively large-scaled information processing apparatus such as a personal computer have been proposed in Japanese Patent Laid-Open Nos. 910-222508, 11-96144, and 11-238053. However, these techniques do not assume a portable radio communication terminal having a limited memory capacity.

SUMMARY OF THE INVENTION

It is an object of the present invention to provide a portable radio communication terminal capable of using various kinds of multimedia contents in a desired format, and an expression style processing method thereof.

In order to achieve the above object, according to the present invention, there is provided an expression style processing method for a portable radio communication terminal which transmits/receives a multimedia content formed from an object having character data, image data, or voice data through a network including a radio data communication network, comprising the steps of storing a plurality of objects, generating an expression style format for expressing the stored objects, and storing the generated expression style format.

DESCRIPTION OF THE PREFERRED EMBODIMENTS

The present invention will be described below in detail with reference to the accompanying drawings.

Figure 1:
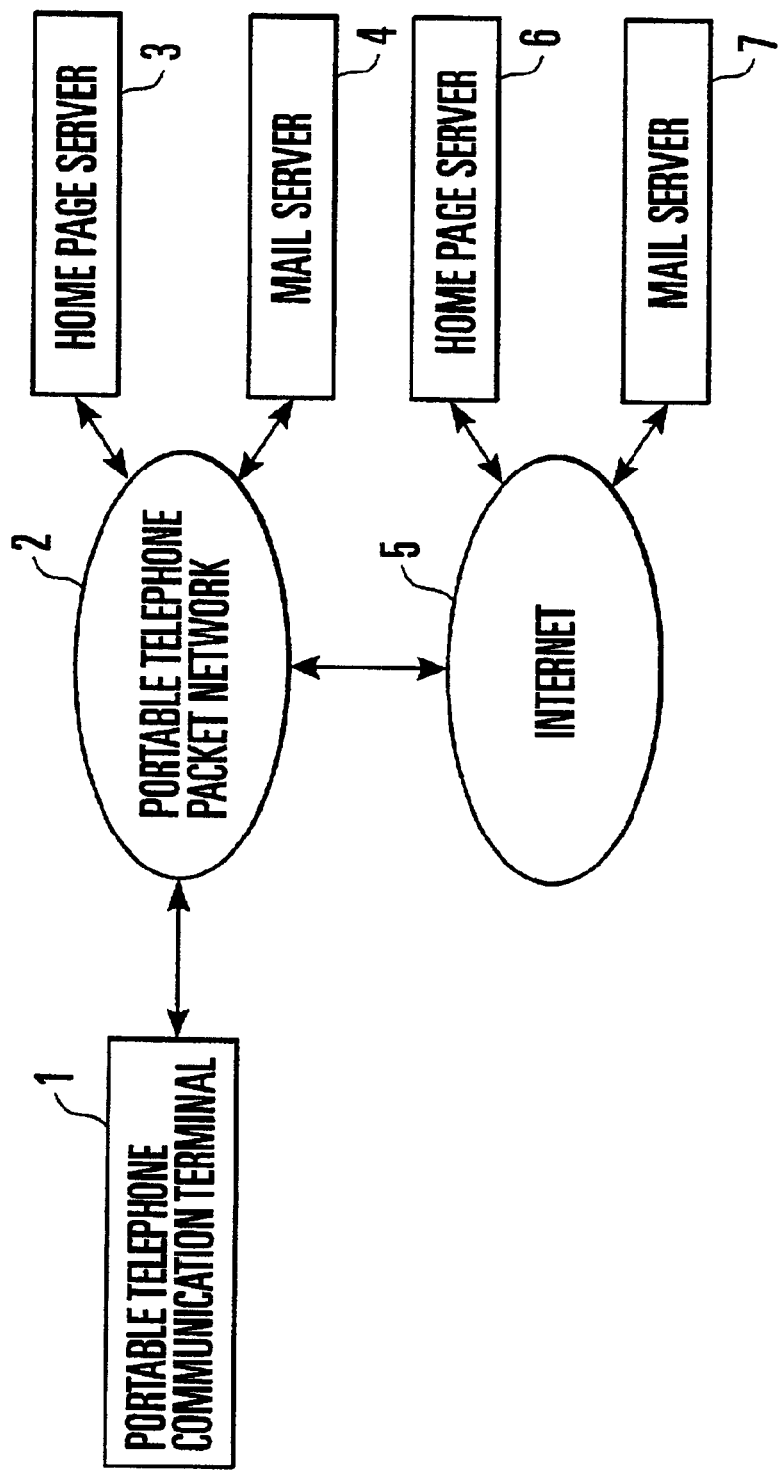
FIG. 1 is a block diagram of a radio communication system to which the present invention is applied.

FIG. 1 shows a radio communication system to which the present invention is applied. Referring to FIG. 1, a portable radio communication terminal (to be referred to as a portable terminal hereinafter) 1 as a radio communication terminal is connected to a portable telephone packet network 2 to receive a content described in a description language such as the HTML or XML and published by a home page server 3 on the portable telephone packet network 2 or to a home page server 6 on the Internet 5. An expression style format and object generated by the portable terminal 1 are transmitted/received to/from mail servers 4 and 7.

Figure 2:
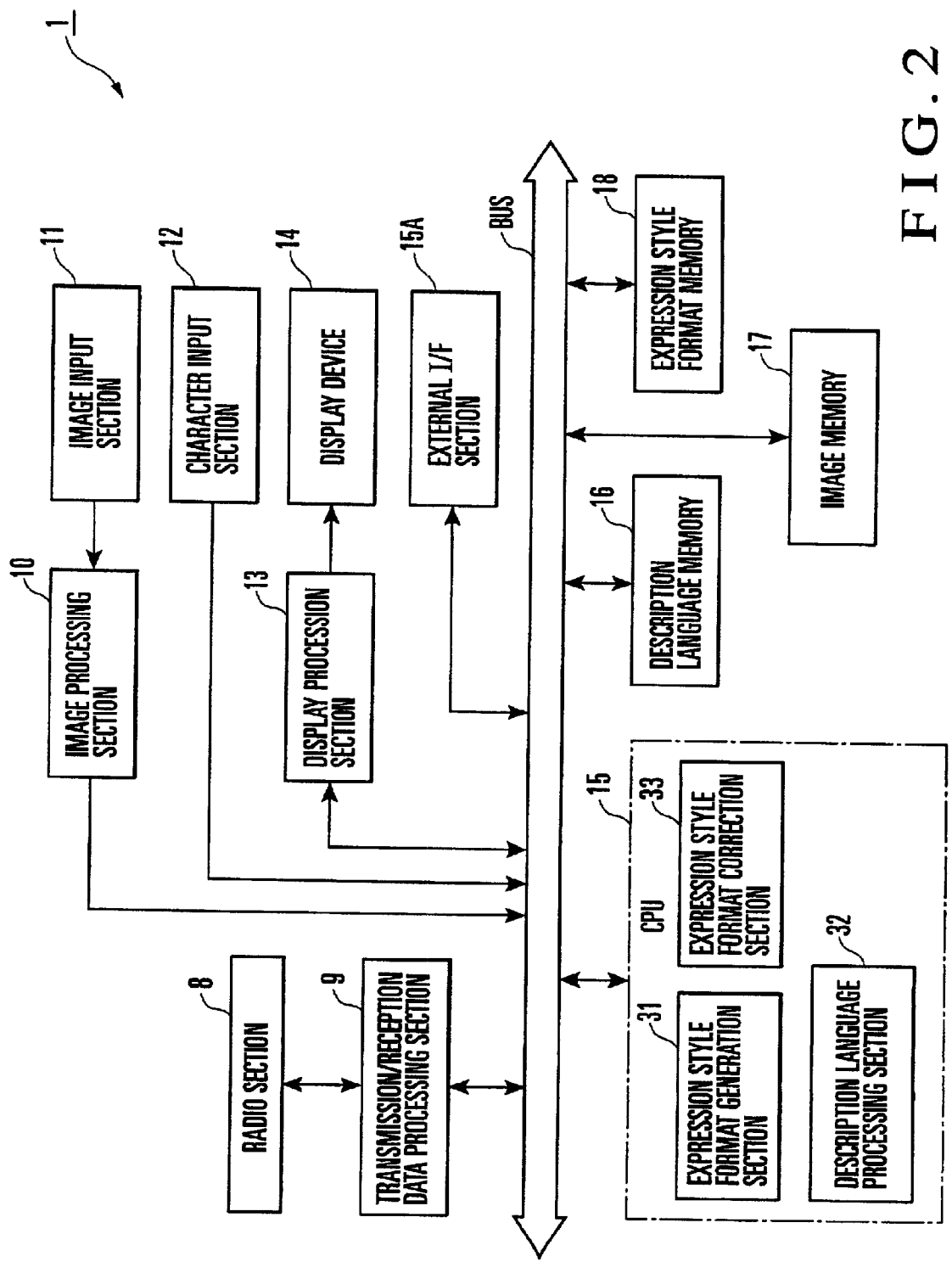
FIG. 2 is a block diagram of a portable radio communication terminal according to the first embodiment of the present invention.

FIG. 2 shows the portable terminal according to the first embodiment of the present invention. Referring to FIG. 2, the portable terminal 1 shown in FIG. 1 comprises a radio section 8 for performing radio communication with the radio base station of a portable telephone system, a transmission/reception data processing section 9 for executing communication protocol processing for radio communication, an image input section 11 such as a camera for inputting image data, an image processing section 10 for processing image data input from the image input section, a character input section 12 for inputting characters, a display processing section 13 for executing display processing of character/image data, a display device 14 for displaying output data from the display processing section 13, a description language memory 16 for storing a description language such as the HTML or XML, an image memory 117 for storing image data, an expression style format memory 18 for storing an expression style format, an external I/F section 15A serving as an interface for exchanging various data with an external device such as a camera, personal computer, or memory card, and a CPU 15 for controlling the entire portable terminal 1. These components are connected to each other through an internal bus BUS.

The CPU 15 has, as functional processing sections constructed by programs, an expression style format generation section 31 for generating an expression style format for arbitrarily expressing objects stored in various memories, a description language processing section 32 for converting characters input from the character input section 12 to digitally processible character data, and an expression style format correction section 33 for changing the expression format of an arbitrary object registered in the expression style format stored in the expression style format memory 18 to correct the expression style format.

The expression style format used in this embodiment may be included in a character information description language such as the HTML style sheet or SMIL. Alternatively, an expression that describes only a style separately from an object may be selected. Those who are skilled in the art recognize the HTML style sheet or SMIL very well. Its structure is irrelevant to the present invention, and a detailed description thereof will be omitted.

Figure 3:
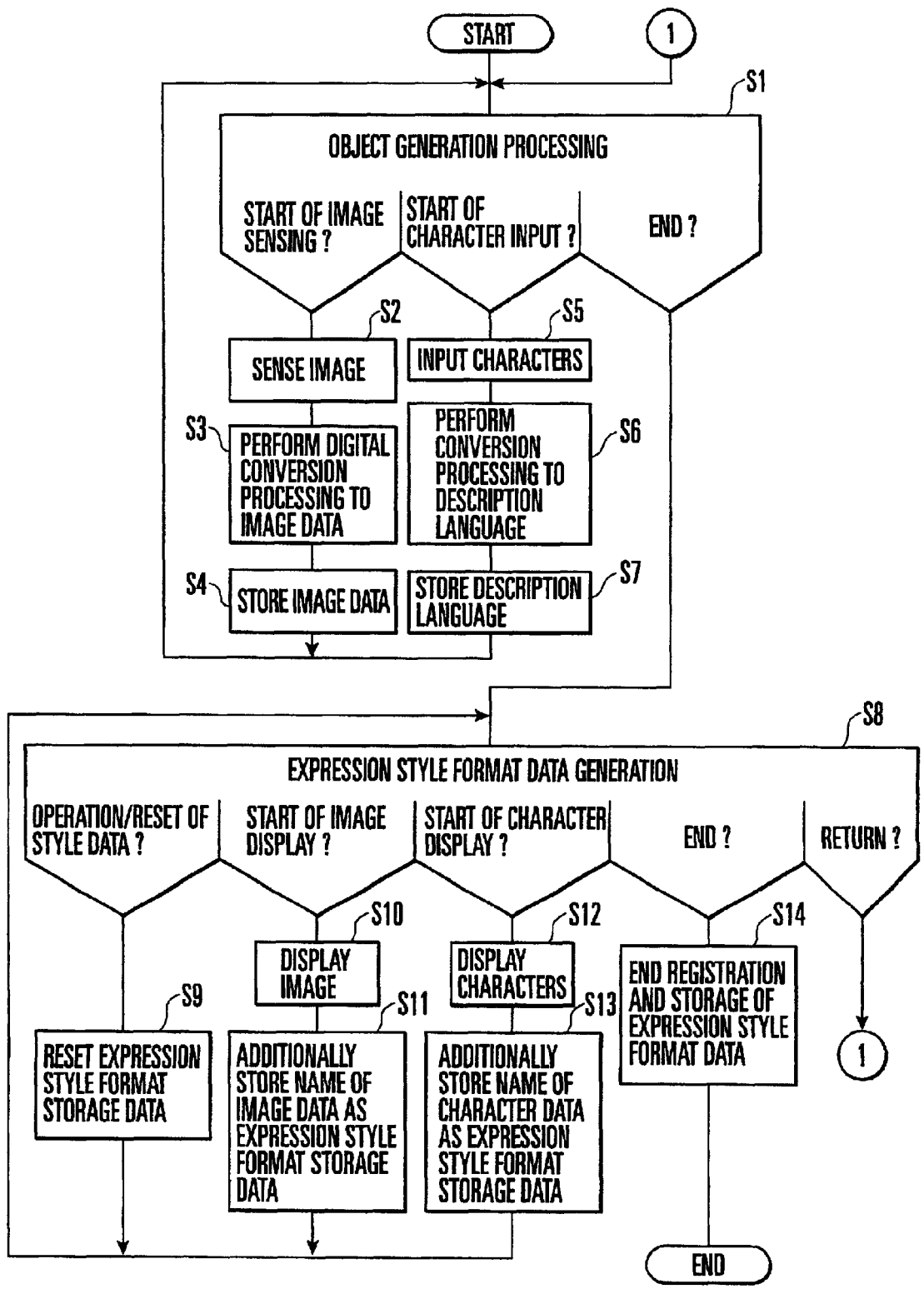
FIG. 3 is a flow chart showing style processing operation by the portable radio communication terminal shown in FIG. 2.

Style processing operation by the portable terminal 1 shown in FIG. 2 will be described next with reference to the flow chart shown in FIG. 3. Referring to FIG. 3, object generation operation and expression style format generation operation will be described as style processing.

First, an object such as characters or image is generated as an expression target under the control of the CPU 15 (step S1). To sense an image in this object generation processing, an image is sensed by the image input section 11 (step S2). The obtained image is converted to digitally processible image data by the image processing section 10 (step S3) and stored in the image memory 17 (step S4). As image sensing in step S2, not only sensing with the camera but also an image read with an image scanner or data transfer from a detachable memory or another terminal can be done.

When characters are input in step S1, the description language processing section 32 converts the characters input from the character input section 12 to a description language such as the HTML (steps S5 and S6) and stores the description language in the description language memory 16 (step S7).

After object generation is ended, the expression style format generation section 31 generates expression style format data (step S8). When style data is reset in step S8, data stored in the expression style format memory 18 is erased (step S9). When image data display is selected by user operation, the designated image data is displayed from image data stored in the image memory 17 (step S10). The name of the displayed image data is stored in the expression style format memory 18 as expression style format storage data (step S11).

When character display is selected by user operation in step S8, the characters stored in the description language memory 16 are displayed (step S12). The name of the displayed character data, e.g., the name of the description language file is stored in the expression style format memory 18 as expression style format storage data (step S13). With this user operation, the selected and displayed contents and the order thereof are stored as an expression style format, thus expression style format data as data for reconstructing expression is completed. When display of the image and characters is ended by user operation, registration of expression style format data is ended (step S14). When "return" is selected in step S8, the flow returns to object generation processing in step S1.

Figure 4:
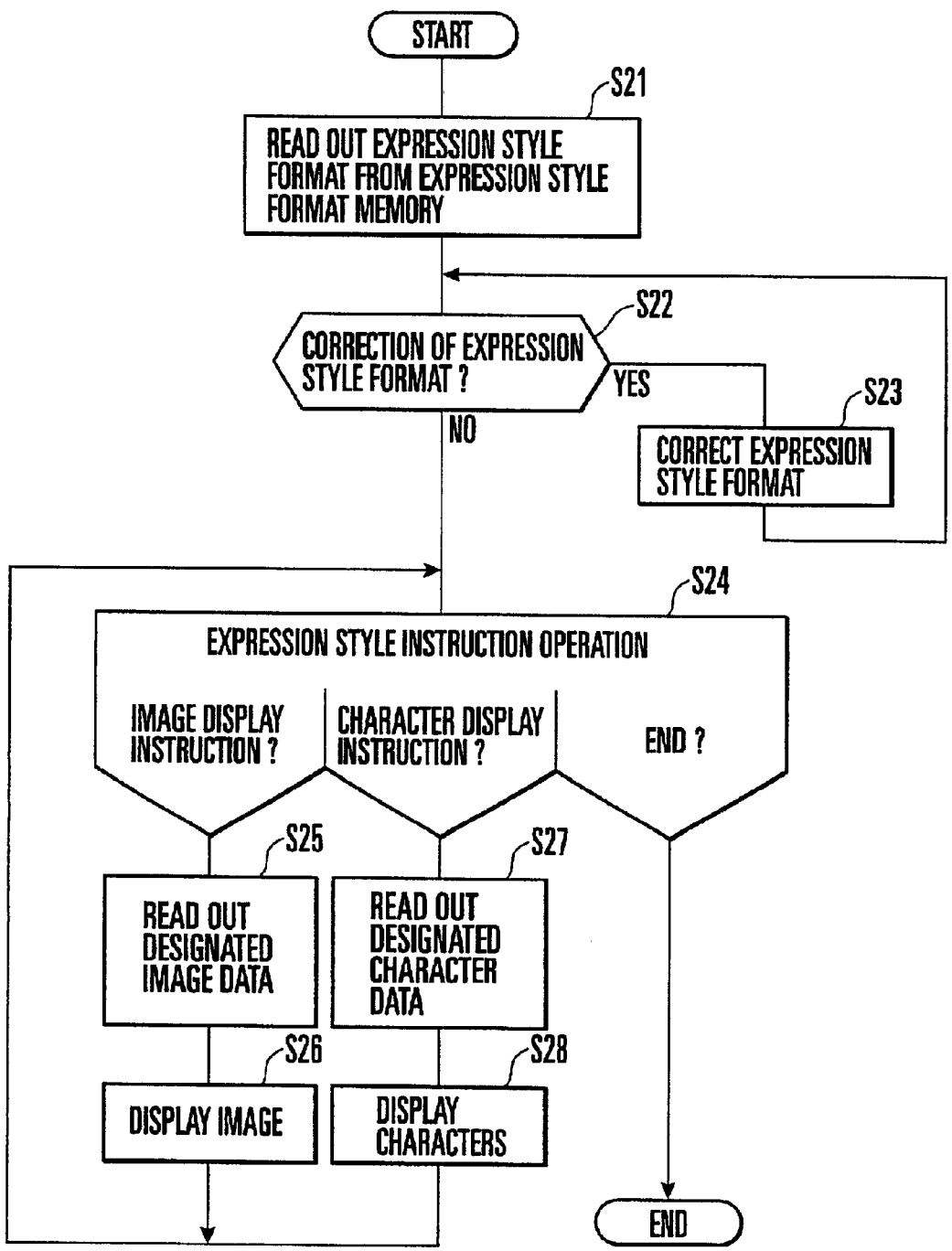
FIG. 4 is a flow chart showing another style processing operation by the portable radio communication terminal shown in FIG. 2.

Another style processing operation by the portable terminal 1 shown in FIG. 2 will be described with reference to the flow chart shown in FIG. 4. Referring to FIG. 4, content reconstruction operation based on expression style format data will be described as style processing.

The CPU 15 reads out an expression style format from the expression style format memory 18 (step S21) and determines whether the expression style format is to be corrected (step S22). If YES in step S22, the expression style format correction section 33 corrects the expression style format (step S23). If NO in step S22, the expression style is instructed by user operation (step S24). Thus reconstruction operation based on the expression style format starts.

In step S24, under the control of the CPU 15 functioning as an expression processing means, corresponding processing is instructed in accordance with the instruction order of the expression style format. When image display is instructed, the designated image data is read out from the image memory 17 (step S25) and displayed on the display device 14 through the display procession section 13 (step S26) When character display is instructed, the designated character data is read out from the description language memory 16 (step S27) and displayed on the display device 14 through the display procession section 13 (step S28). When the reading from the expression style format memory 18 is ended, the style processing is ended.

Figure 5:
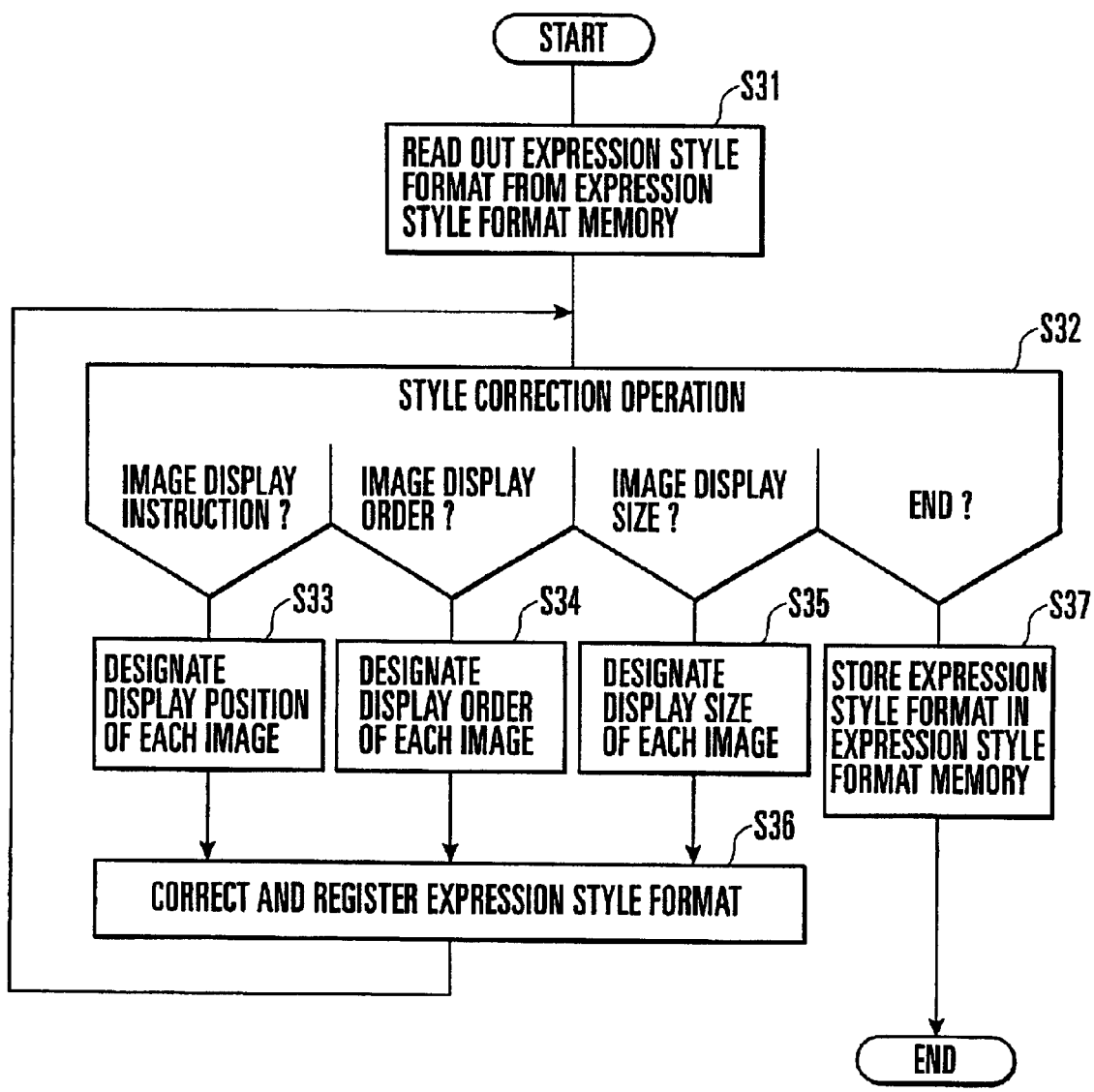
FIG. 5 is a flow chart showing still another style processing operation by the portable radio communication terminal shown in FIG. 2.

Still another style processing operation by the portable terminal 1 shown in FIG. 2 will be described next with reference to the flow chart shown in FIG. 5. Referring to FIG. 5, expression style format correction operation will be described as style processing.

First, an expression style format is read out from the expression style format memory 18 (step S31). The expression style format correction section 33 corrects the style in accordance with user operation (step S32). To correct an image display position in step S32, the display position for each image is designated by user operation (step S33) To correct the image display order, the display order of each image is designated by user operation (step S34). To correct the image display size, the display size of each image is designated by user operation (step S35). After the correction operation, the designated expression style format is changed and registered (step S36). When all style corrections are ended, the changed and registered expression style format is stored in the expression style format memory 18 (step S37). Note that the image display order includes designation of superposition order for superimposed display.

According to this embodiment, since not only an expression style format of multimedia information is generated on the content provider side but also the expression style format can be freely generated and processed on the terminal side, a customized content can be generated using the style. In addition, the generated content expression style format can be transmitted to a third party in cooperation with electronic mail.

Figure 6:
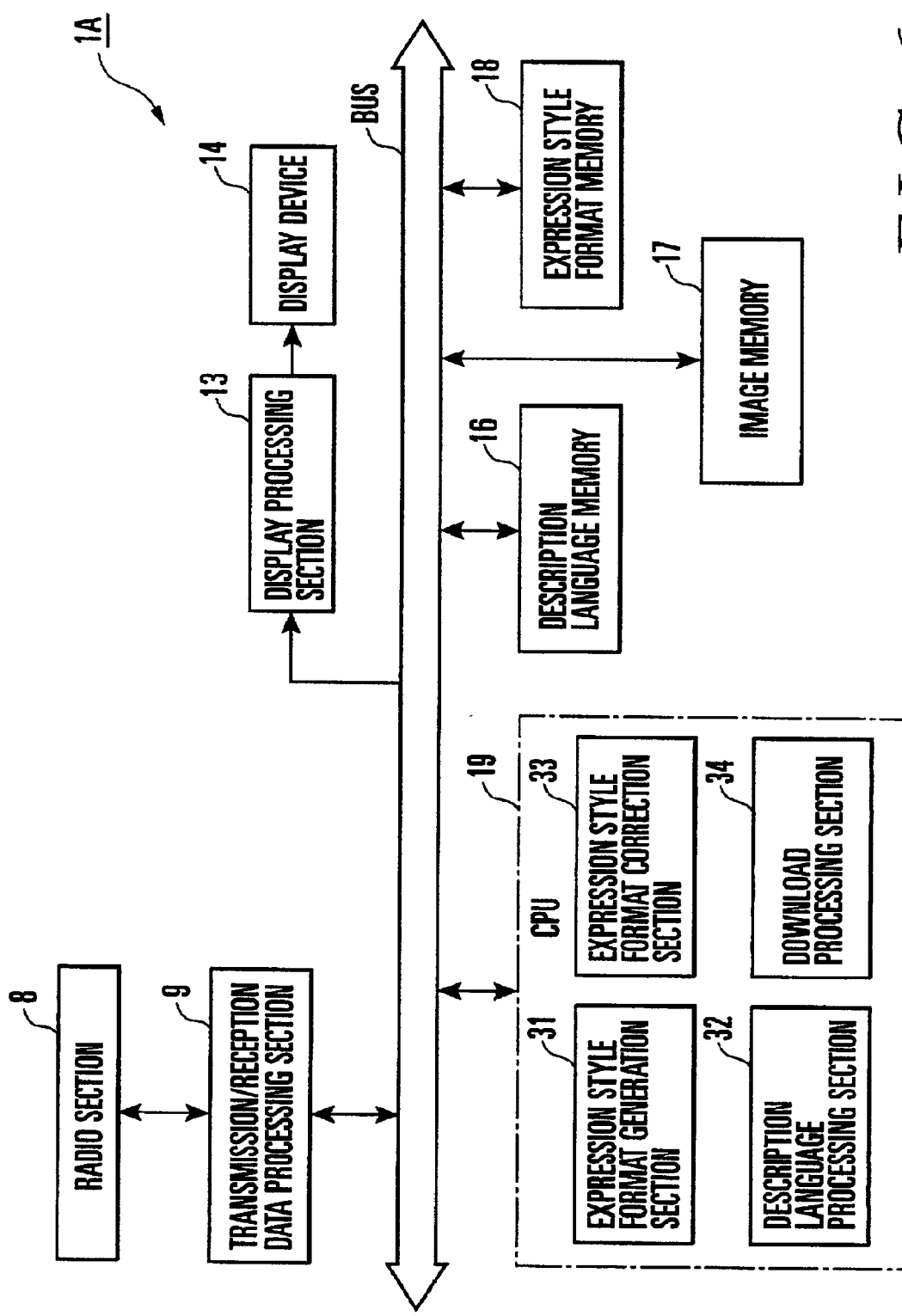
FIG. 6 is a block diagram of a portable radio communication terminal according to the second embodiment of the present invention.

FIG. 6 shows a portable terminal according to the second embodiment of the present invention. In this embodiment, an object to be displayed is acquired from, e.g., a home page connected to a radio network.

Referring to FIG. 6, a portable terminal 1A is different from the portable terminal 1 shown in FIG. 2 in that the image processing section 10, image input section 11, and character input section 12 which are used to generate an object are omitted, and instead, a download processing section 34 with which a CPU 19 downloads character data, a description language, image data, or voice data through a network is prepared. In this embodiment, instead of generating an object on the terminal side, an object is acquired from a home page or mail through the Internet by a radio section 8 and transmission/reception data processing section 9.

Figure 7:
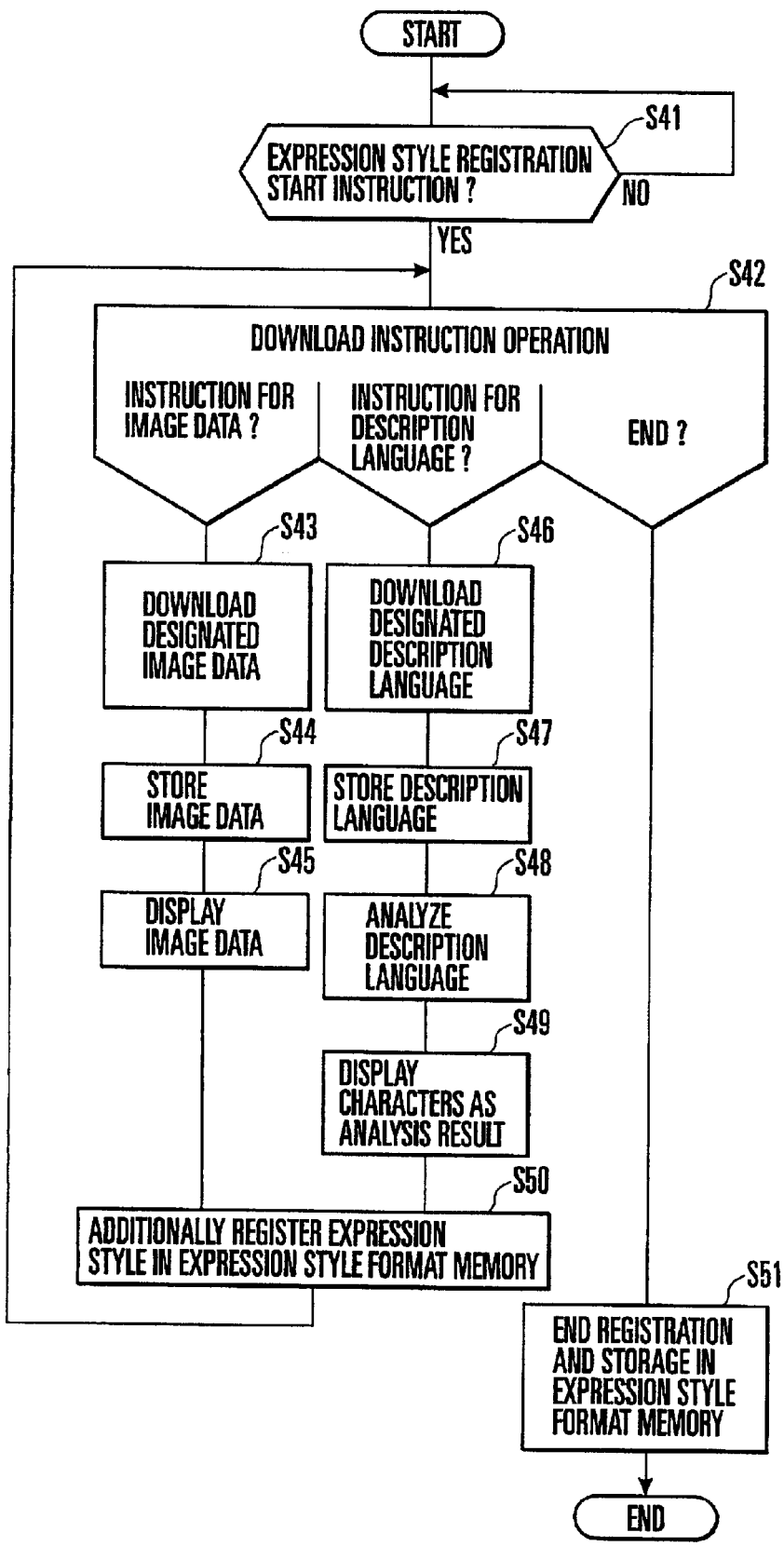
FIG. 7 is a flow chart showing style processing operation by the portable radio communication terminal shown in FIG. 6.

Style processing by the portable terminal shown in FIG. 6 will be described next with reference to the flow chart shown in FIG. 7. Referring to FIG. 7, expression style format correction operation will be described as style processing.

When the start of registration of an expression style format is instructed by user operation (step S41), the download processing section 34 executes download from a home page or file server (step S42). In step S42, when the target of the download instruction is image data, the designated image data is downloaded (step S43) and stored in an image memory 17 (step S44). The downloaded image data is displayed on a display device 14 (step S45). The name of the image data is additionally registered in an expression style format memory 18 as an expression style format (step S50).

When the target of the download instruction is a description language, the designated description language data is downloaded (step S46), stored in a description language memory 16 (step S47), and analyzed (step S48). The analysis result is displayed on the display device 14 (step S49). The name of the description language is additionally registered in the expression style format memory 18 as an expression style format (step S50). When the download instruction is ended by user operation, registration in the expression style format memory 18 is ended (step S51).

Figure 8:
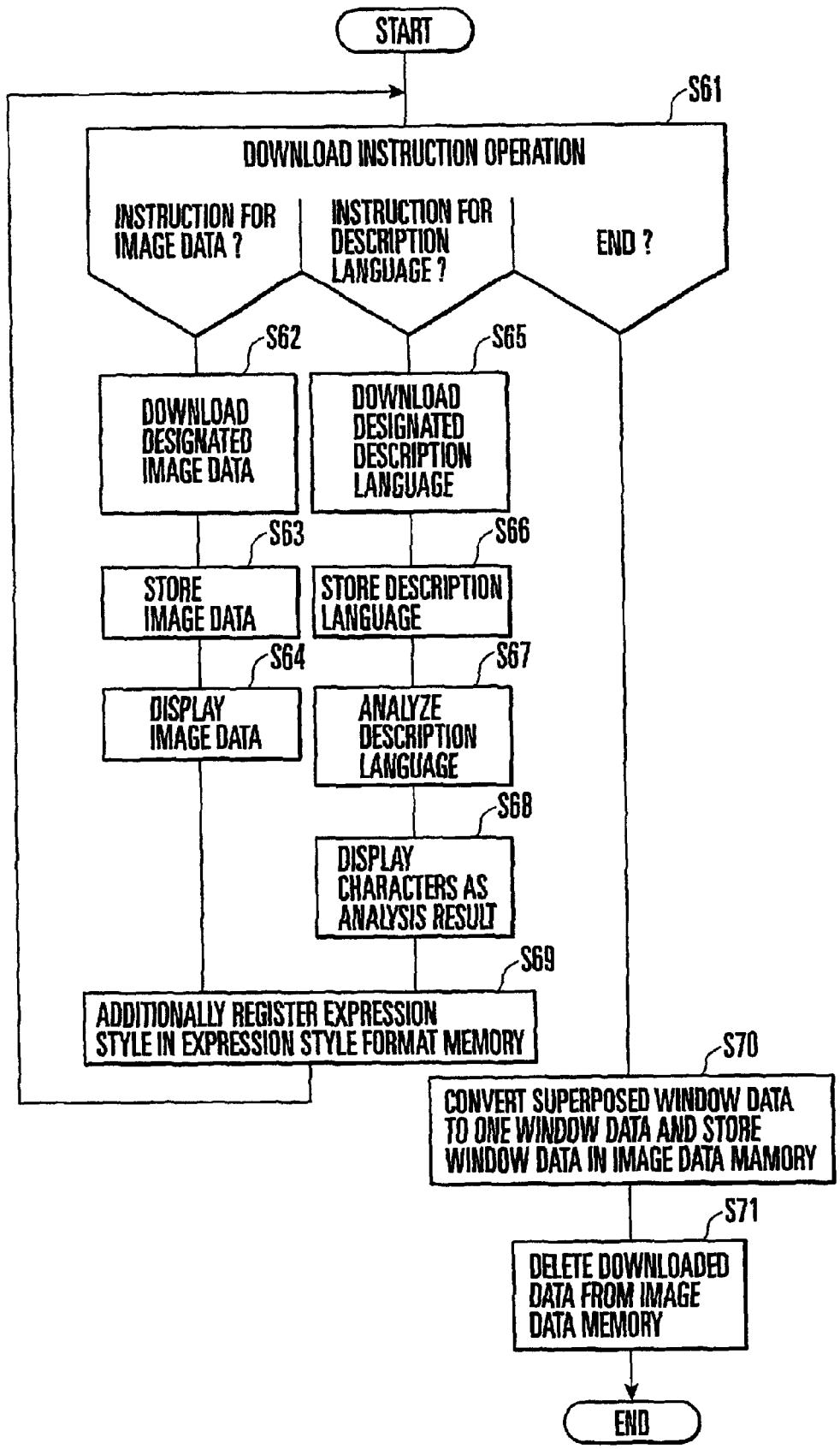
FIG. 8 is a flow chart showing another style processing operation by the portable radio communication terminal shown in FIG. 6.

Another style processing operation by the portable terminal 1A shown in FIG. 6 will be described next with reference to the flow chart shown in FIG. 8. Referring to FIG. 8, image data storage operation for an acquired object will be described as style processing.

In accordance with an instruction by user operation, the download processing section 34 downloads expression style format data from a home page or file server and registers the downloaded expression style format data in the expression style format memory 18 (steps S61 to S69). These operations are the same as in steps S42 to S50 in FIG. 7, and a detailed description thereof will be omitted. When the download instruction is ended by user operation, superposed image data is extracted as an expression style format, generated as new image data, and stored in the image data memory (step S70). Each of the superposed image data is deleted from the image memory 17 (step S71).

According to this embodiment, since the expression style format can be freely generated and worked on the terminal side using an object from the content provider side, a customized content can be generated using the style. In addition, the generated content expression style format can be transmitted to a third party in cooperation with electronic mail. Furthermore, since a plurality of window data can be synthesized into one window data, necessary information can be stored even by a terminal such as a portable telephone having a limited memory capacity.

Figure 9:
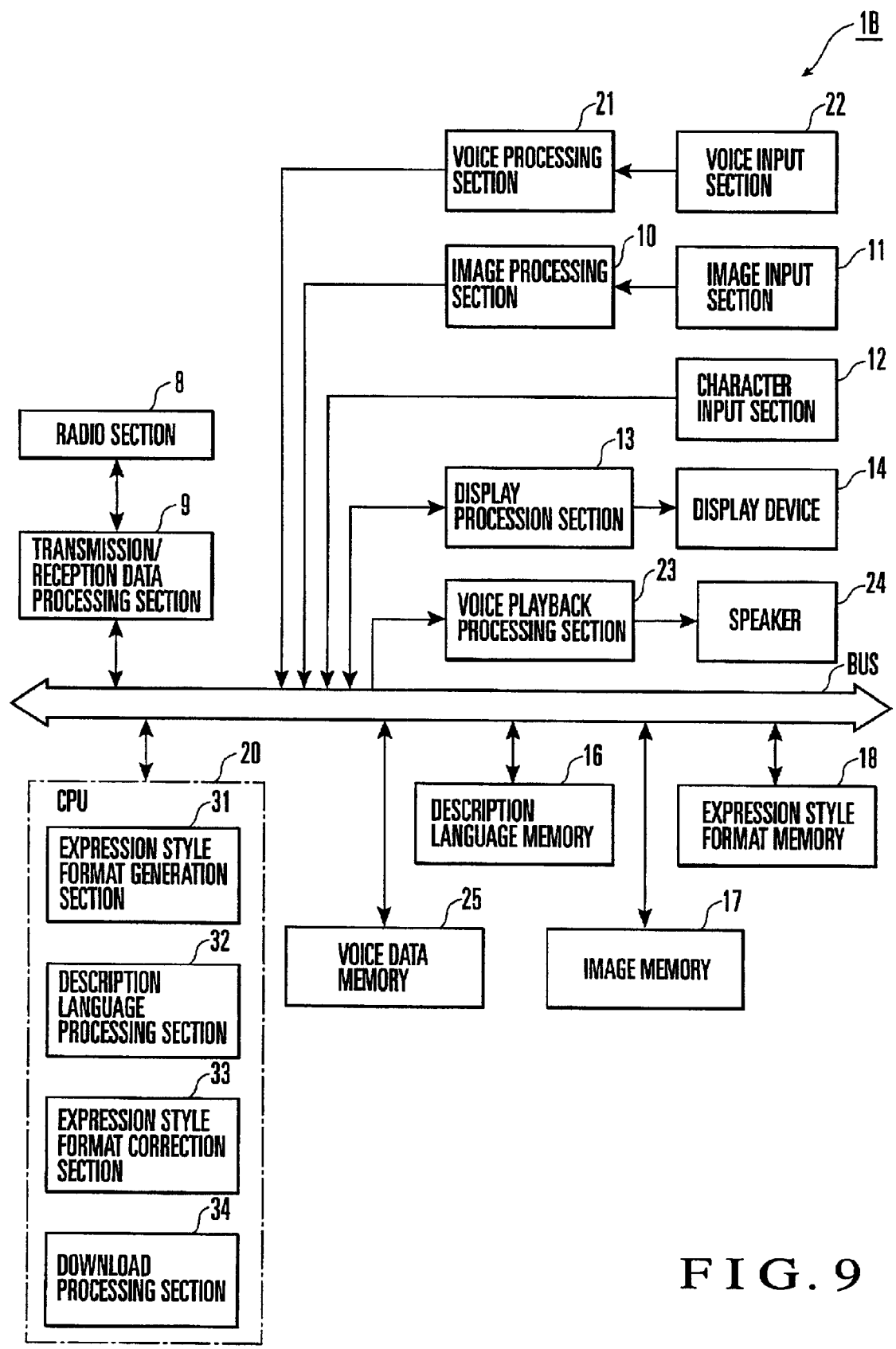
FIG. 9 is a block diagram of a portable radio communication terminal according to the third embodiment of the present invention.

FIG. 9 shows a portable terminal according to the third embodiment of the present invention. In this embodiment, voice data such as a voice is attached as part of an object.

Referring to FIG. 9, a portable terminal 1B has, in addition to the arrangement of the portable terminal 1 shown in FIG. 2, a voice input section 22 for inputting a voice, a voice processing section 21 for converting a voice to digitally processible voice data, a voice data memory 25 for registering voice data, a voice playback processing section 23 for executing voice playback processing, and a speaker 24. A CPU 20 has a download processing section 34, like the portable terminal 1A shown in FIG. 6.

Figure 10:
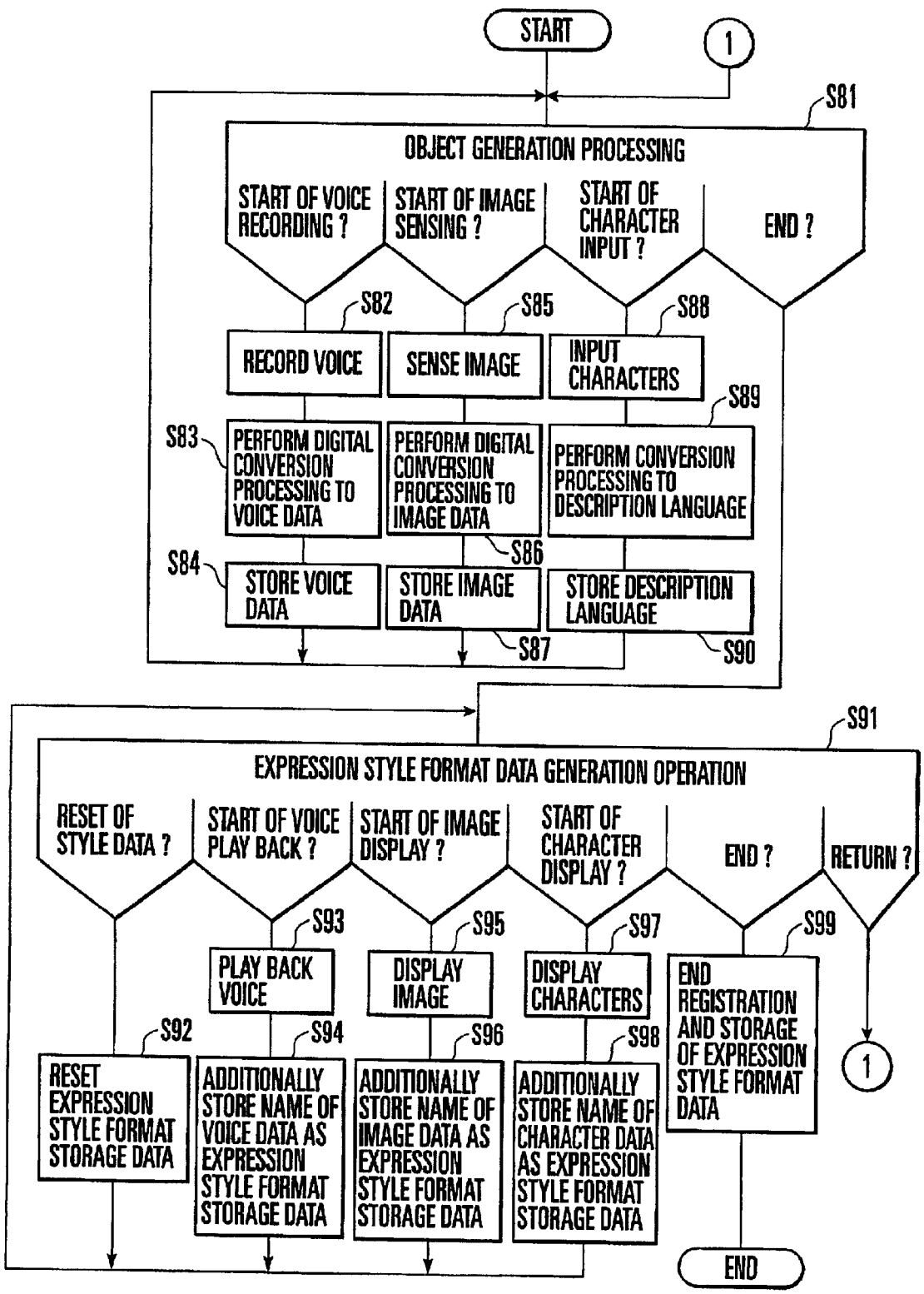
FIG. 10 is a flow chart showing style processing operation by the portable radio communication terminal shown in FIG. 9.

Style processing operation by the portable terminal 1B shown in FIG. 9 will be described next with reference to the flow chart shown in FIG. 10. Referring to FIG. 10, object generation operation and expression style format generation operation will be described as style processing.

The CPU 20 performs object generation operation in accordance with user operation (step S81). In step S81, when the start of voice recording is instructed as the object generation operation, a voice is recorded by the voice input section 22 (step S82). The recorded voice is converted to digital voice data by the voice processing section 21 (step S83). The voice data is stored in the voice data memory 25.

In generating expression style format data (step S91), the voice data is designated by an instruction for the start of voice playback, read out from the voice data memory 25, and played back from the speaker 24 through the voice playback processing section 23 (step S93). The voice data is additionally registered in an expression style format memory 18 as expression style format data (step S94). When "return" is selected in step S91, the flow returns to object generation processing in step S81.

Processing of generating an object such as characters or an image (steps S85 to S90), reset processing for stored expression style format data (step S92), expression style format data generation processing based on the generated object (steps S95 to S98), and registration processing of the generated expression style format data (step S99) are the same as in steps S3 to S8 and S10 to S15 in FIG. 3, and a detailed description thereof will be omitted.

Figure 11:
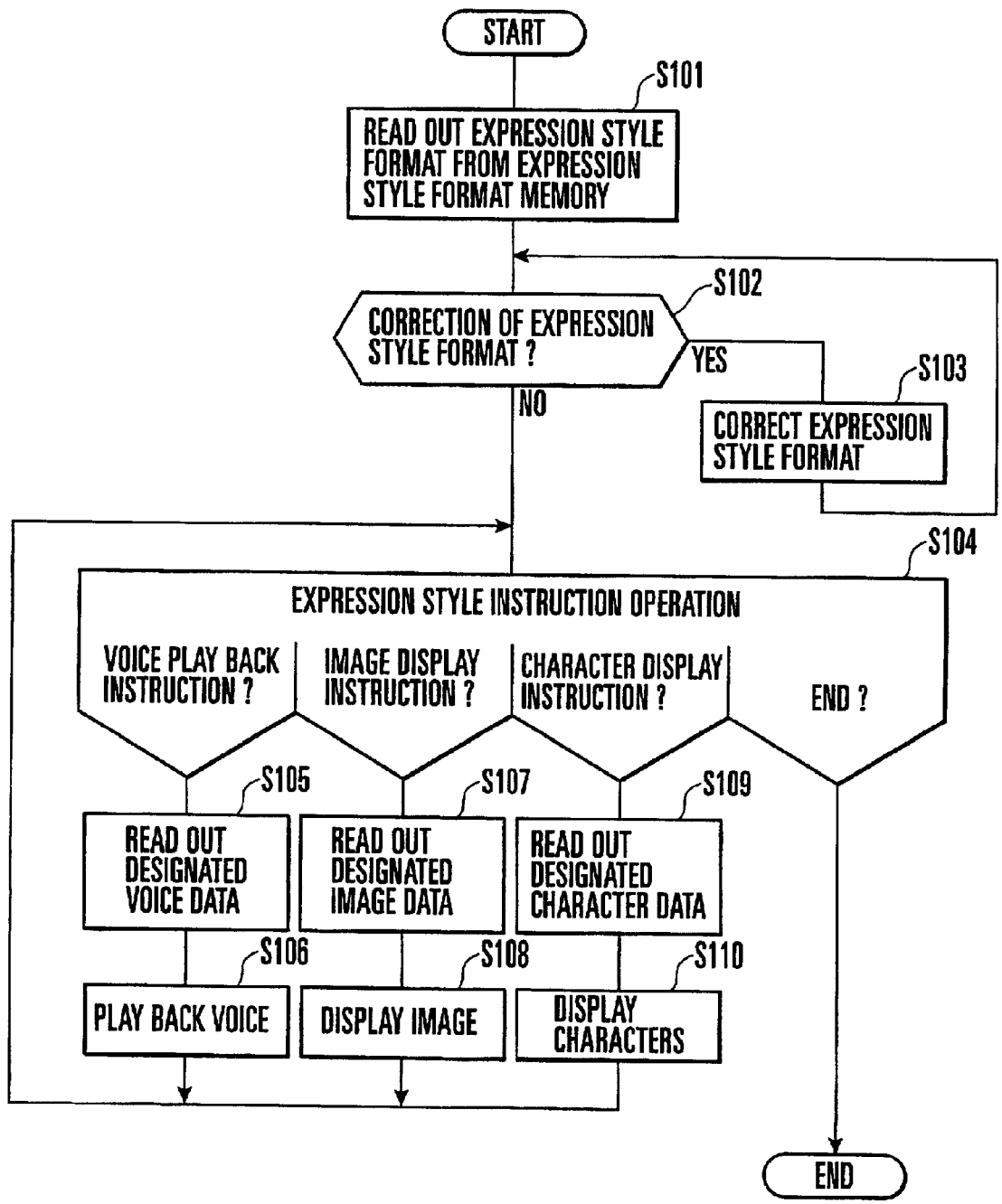
FIG. 11 is a flow chart showing another style processing operation by the portable radio communication terminal shown in FIG. 9.

Another style processing operation by the portable terminal shown in FIG. 9 will be described next with reference to the flow chart shown in FIG. 11. Referring to FIG. 11, reconstruction operation based on expression style format data will be described as style processing.

First, the CPU 20 reads out an expression style format from the expression style format memory 18 (step S101) and determines whether the expression style format is to be corrected (step S102). If YES in step S102, an expression style format correction section 33 corrects the expression style format (step S103). If NO in step S102, the expression style is instructed by user operation (step S104). Therefore, reconstruction operation based on the expression style format starts.

In step S104, when the instruction of the expression style format read out from the expression style format memory 18 is voice playback, the designated voice data is read out from the voice data memory 25 (step S105) and played back from the speaker 24 through the voice playback processing section 23 (step S106). Reconstruction operation according to an image display instruction or character display instruction (steps S107 to S110) are the same as in steps S22 to S25 in FIG. 4, and a detailed description thereof will be omitted.

Figure 12:
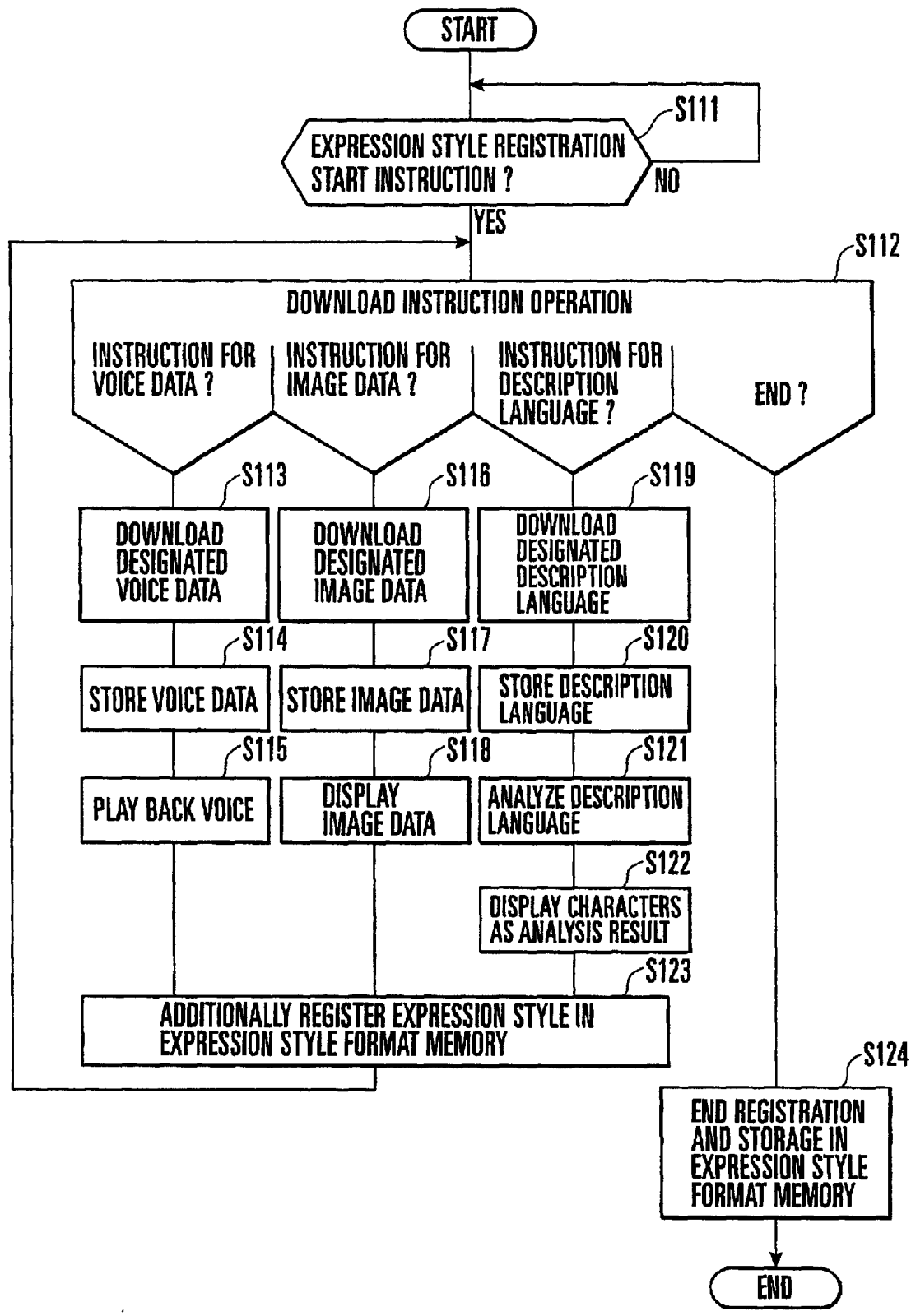
FIG. 12 is a flow chart showing still another style processing operation by the portable radio communication terminal shown in FIG. 9.

Still another style processing operation by the portable terminal 1B shown in FIG. 9 will be described next with reference to the flow chart shown in FIG. 12. Referring to FIG. 12, object acquisition operation and expression style format generation operation will be described as style processing.

When the start of expression style format registration is instructed by user operation (step S11), the download processing section 34 starts downloading from a home page or file server in accordance with user operation (step S112).

In step S112, when the target of the download instruction is voice data, the designated voice data is downloaded (step S113). The downloaded voice data is stored in the voice data memory 25 (step S114) and played back from the speaker 24 through the voice playback processing section 23 (step S115). Next, the name of the voice data is additionally registered in the expression style format memory 18 (step S123). Processing operation of downloading image data or a description language (step S116 to S123) and registration processing operation (step S124) are the same as in steps S39 to S45 and S47 in FIG. 7, and a detailed description thereof will be omitted.

The portable terminal of the present invention will be described next in more detail.

Figure 13A:
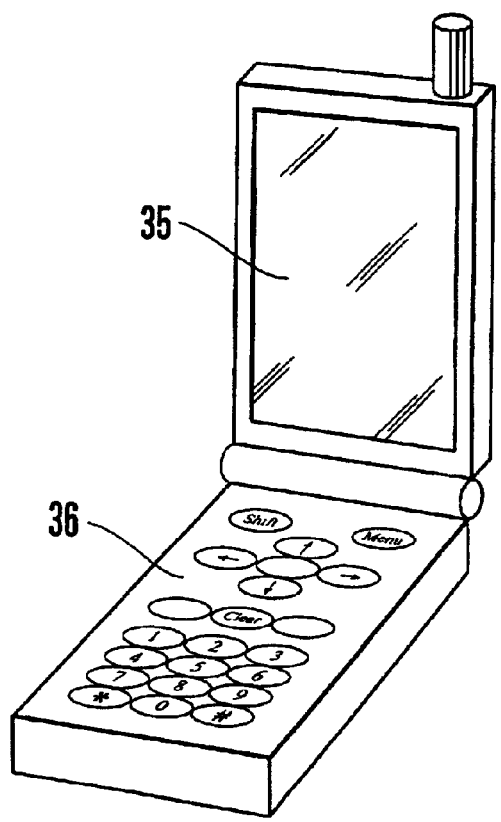
FIG. 13A is a perspective view of the portable radio communication terminal of the present invention.
Figure 13B:
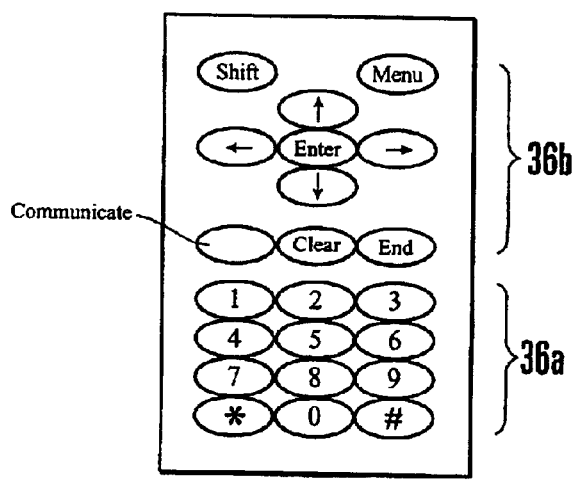
FIG. 13B is a plan view of a key pad shown in FIG. 13A.

As shown in FIG. 13A, the portable radio terminal of the present invention has a display section 35 such as an LCD on which characters, graphic patterns, and images are displayed by dot matrices, and a key pad 36 with which characters or various operations are input. As shown in FIG. 13B, the key pad 36 comprises dial keys 36a capable of inputting kanas, symbols, and alphabets by combining number inputs, and function keys 36b including a menu key, cursor keys, and enter key, and is used for expression style format registration operation.

Figure 14A:
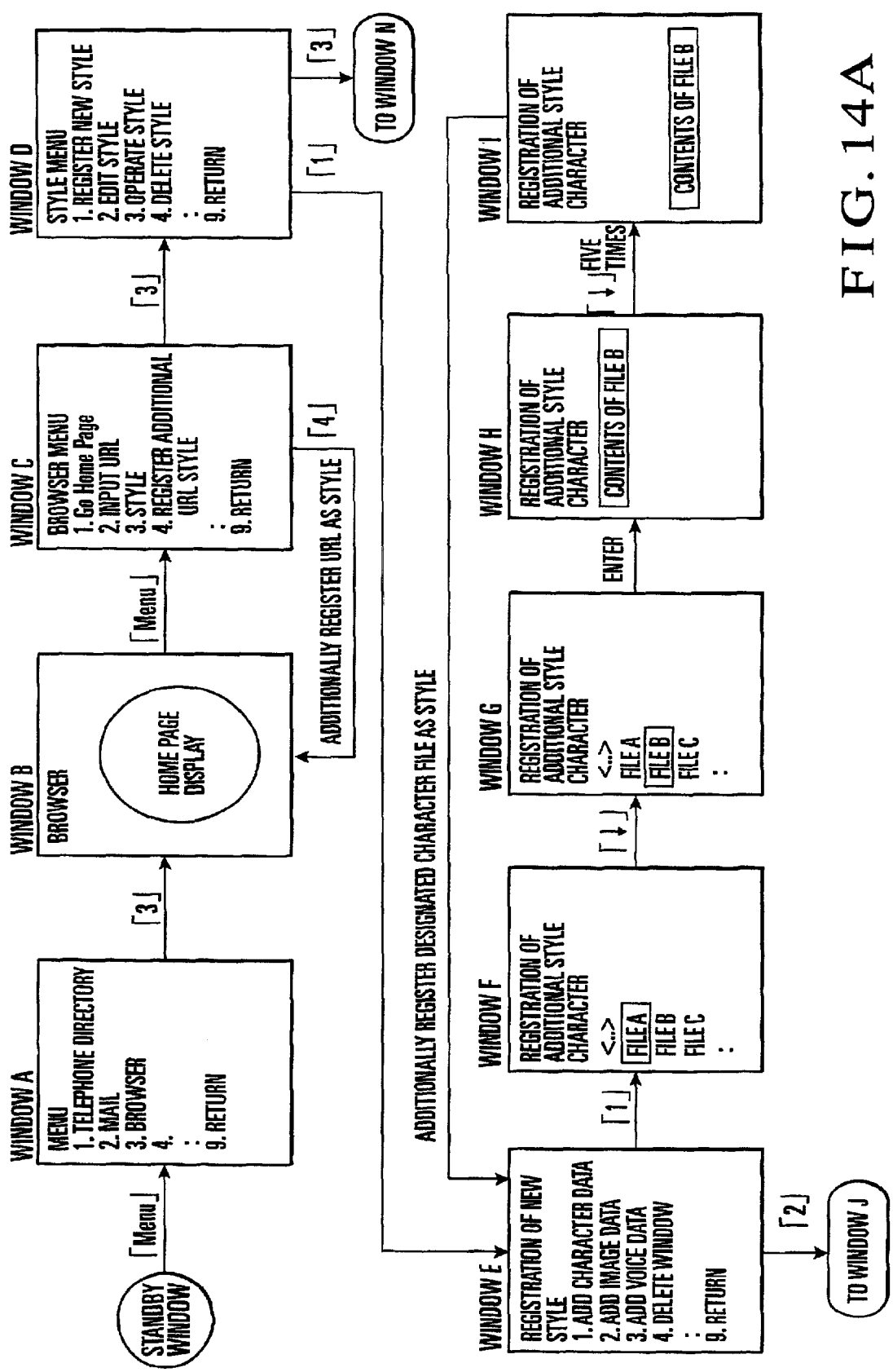
FIGS. 14A and 14B are views showing window display representing expression style format registration operation.
Figure 14B:
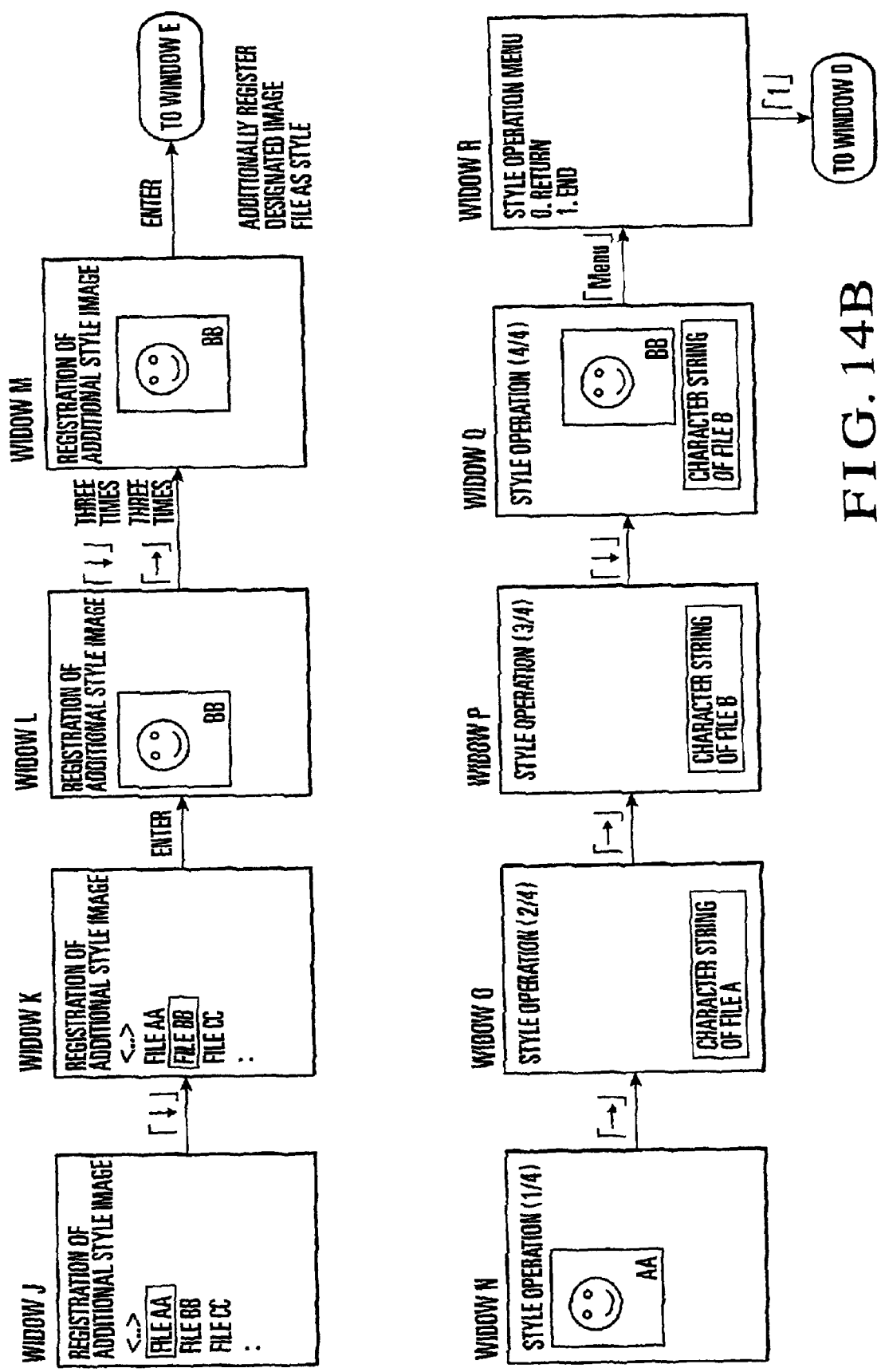

The expression style format registration operation will be described next with reference to FIGS. 14A and 14B. When the menu key is pressed in a standby window displayed in a standby state, a menu is displayed (window A). When "3. browser" is selected in the window A, communication with the home page server 3 or 6 starts through the portable telephone packet network 2 or Internet 5, and a home page registered in advance is displayed (window B). The window can be shifted to a desired home page by operating the browser using the key pad 36.

When the menu key is pressed, a browser menu is displayed (window C). When "4. register additional URL style" is selected in the window C, the URL of a desired home page that is currently being displayed by the browser is additionally registered as a style, and the home page is displayed (window B).

When "3. style" is selected in the window C, a style menu is displayed (window D). When "1. register new style" is selected in the window D, registration processing of a new expression style format is started, and a new style registration window is displayed (window E).

To add character data to the style, "1. add character data" is selected in the window E. A style character additional registration window is displayed, and a list of files which store character data in advance is displayed (window F). When a file B is selected in the window F by moving the cursor with the cursor keys (window G) and then the enter key is pressed, the contents of the file B are displayed in the window (window H). After this, the display position is determined by operating the cursor keys. For example, when the "↓" key is pressed five times, the display position moves downward (window I). When the display position is determined, and in this state, the enter key is pressed, the designated character file is additionally registered as a style, and the window returns to the window E.

To add image data to the style, "2. add image data" is selected in the window E. Thus the style character additional registration window is displayed, and a list of files which store image data in advance is displayed (window J). When a file BB is selected in the window J by moving the cursor with the cursor keys (window K) and then the enter key is pressed, the contents of the file BB are displayed in the window (window L). After this, the display position is determined by operating the cursor keys. For example, when the "↓" key is pressed three times, and the "→" key is pressed three times, the display position moves to the lower right side (window M). When the display position is determined, and in this state, the enter key is pressed, the designated image file is additionally registered as a style, and the window returns to the window E.

To confirm the operation of the registered style, "9. return" is selected in the window E to return the display to the window D. The contents of the registered style operation can be confirmed by selecting "3. operate style" in the window D. In this style example, the image data of an image file A is displayed in a first window N. A next window 0 is displayed by pressing the "→" key, and only the character string of the file A is displayed. Subsequently, only the character string of the file B is displayed as in a window P by pressing the "→" key. When the "↓" key is pressed in this state, the image data of the image file BB and the character string of the file B are displayed in a window Q while being superposed. When the menu key is pressed in the window Q, a window R is displayed. When "0. return" is selected in the window R, the display returns to the window D.

Figure 15:
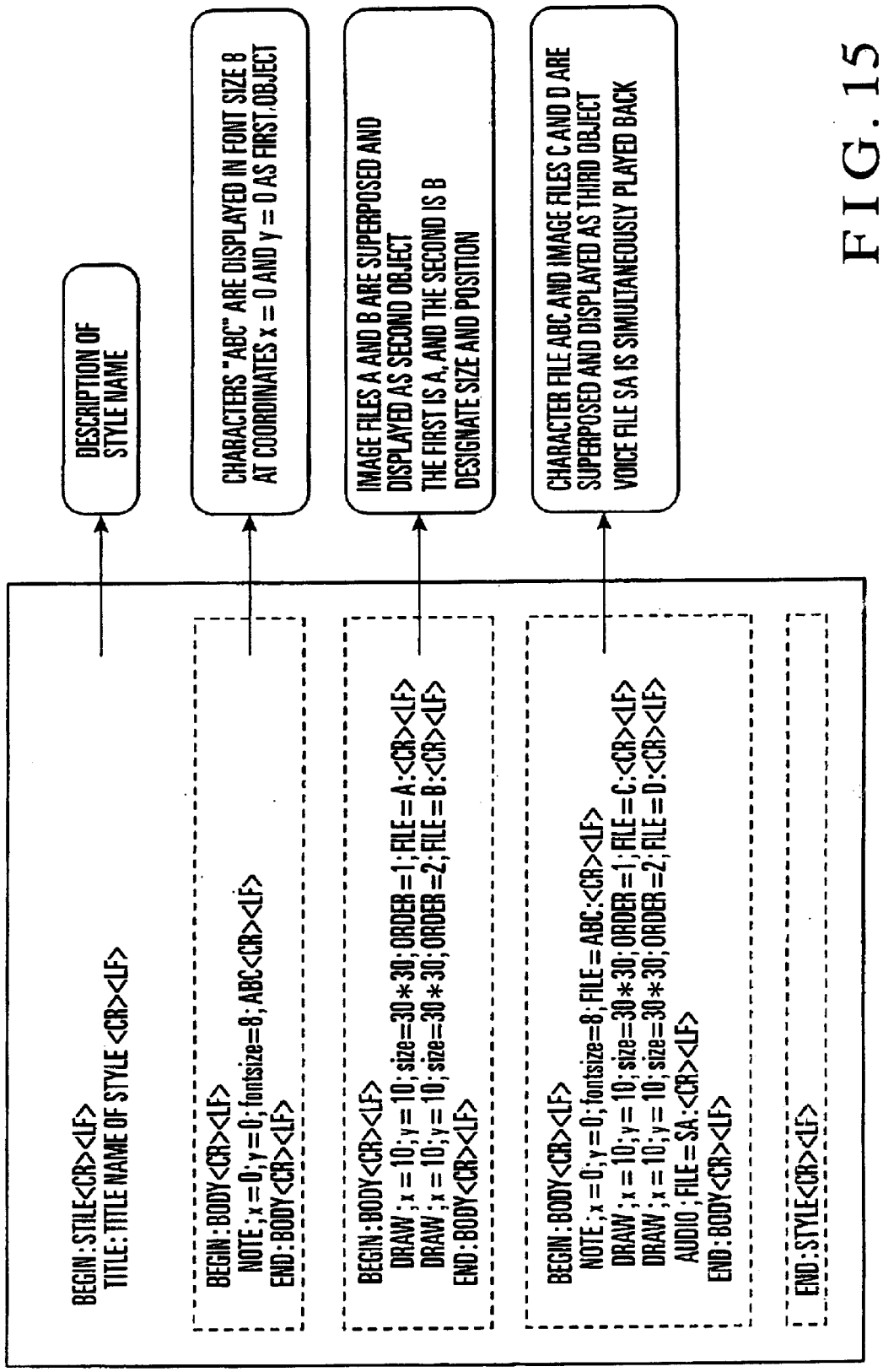
FIG. 15 is a view showing a generated expression style format.
Figure 16:
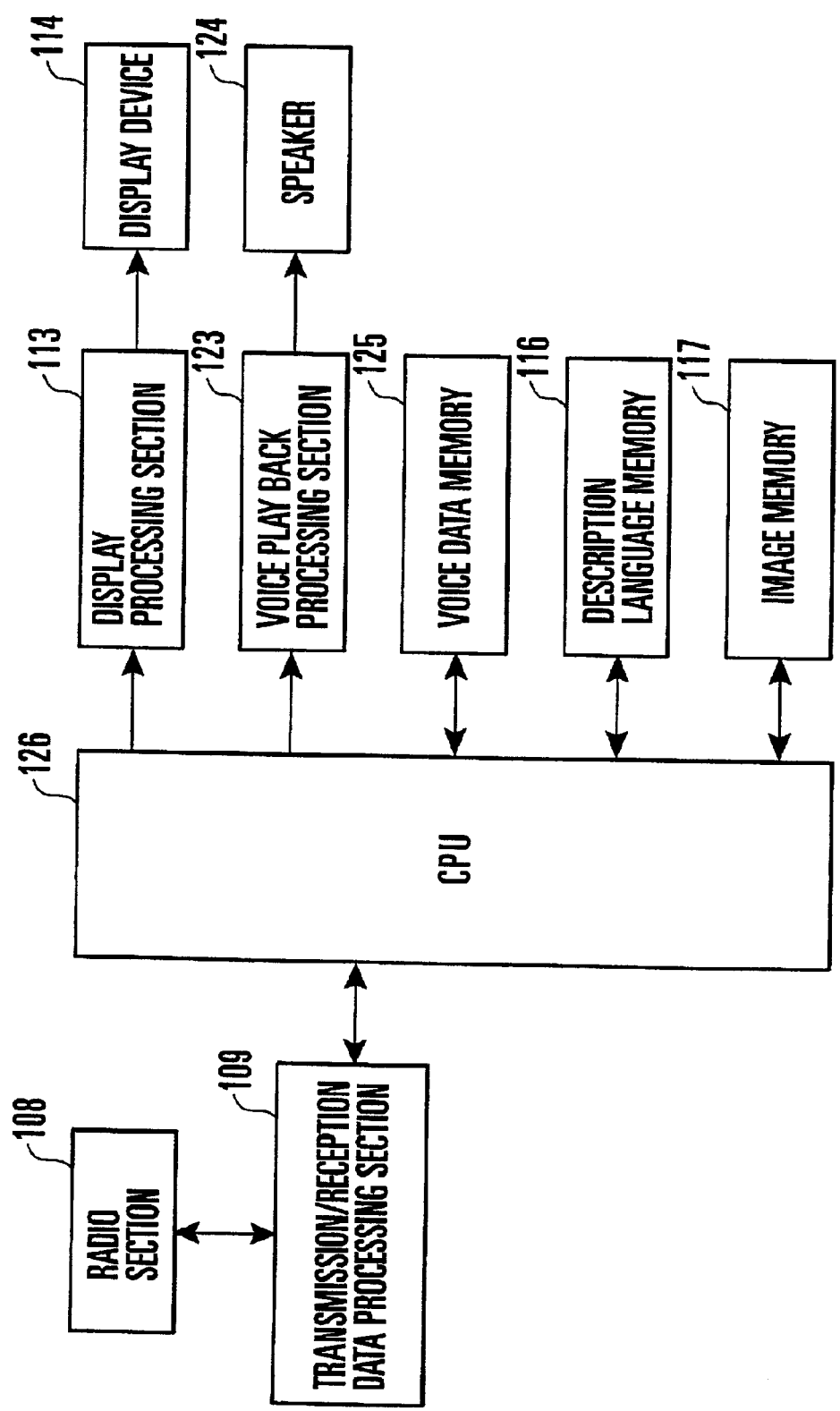
FIG. 16 is a block diagram of a conventional portable radio communication terminal.
Figure 17:
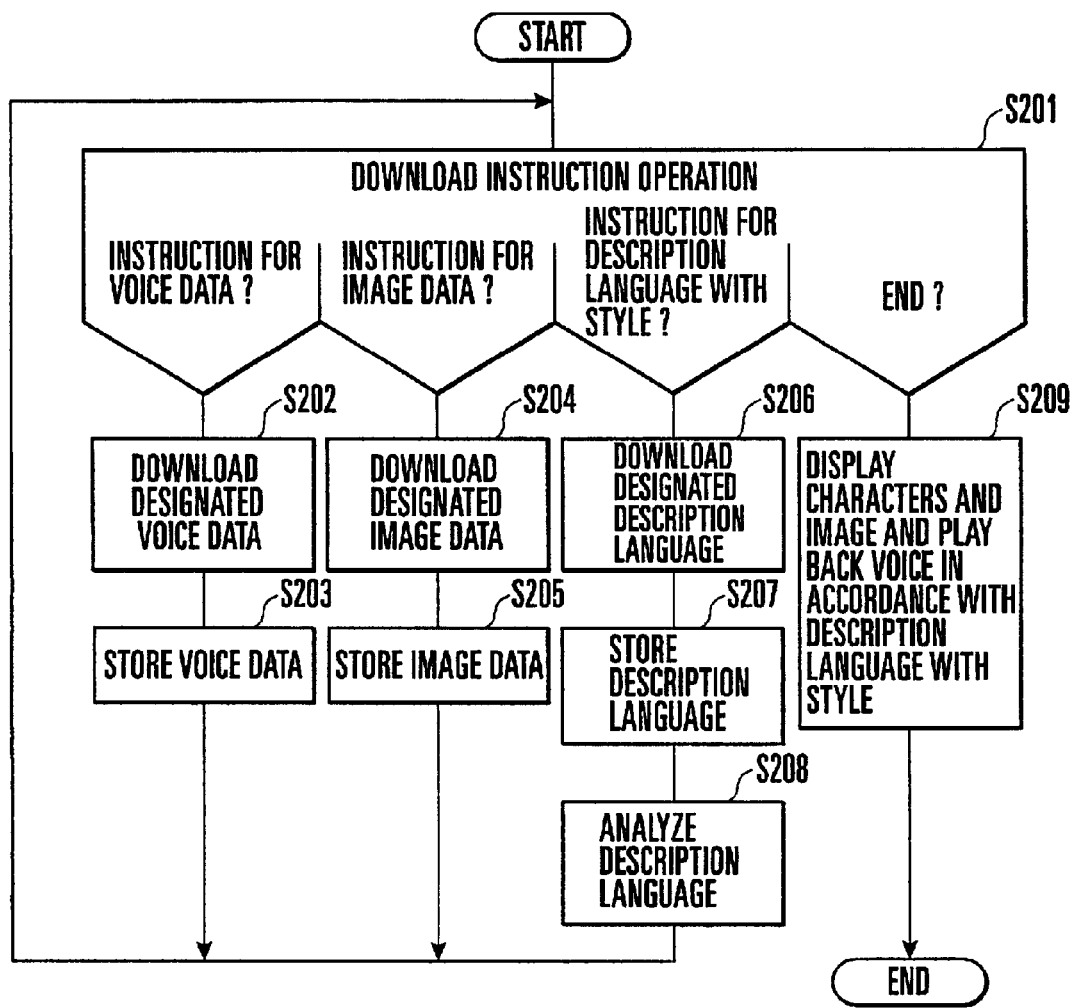
FIG. 17 is a flow chart showing style processing by the portable radio communication terminal shown in FIG. 16.

Such an expression style format is defined by a description language inserted between BEGIN:STYLE and END:STYLE, as shown in FIG. 15. A name is described in TITLE: as the name of STYLE. The expression unit of each object is defined as BODY. Individual objects simultaneously expressed are described between BEGIN:BODY and END:BODY.

FIG. 15 shows three BODIES as examples. The object of the first BODY comprises characters "ABC". The display position and font size are defined. The object of the second BODY comprises superposed image data with file names A and B. The image data with the file name A is superposed on that with the file name B. The object of the third BODY comprises character data with a file name ABC, superposed image data with file names C and D, and voice data with a file name step SA.

As has been described above, according to the present invention, since not only an expression style format of multimedia information is generated on the content provider side but also the expression style format can be freely generated and processed on the terminal side, the user on the terminal side can arbitrarily generate a customized content. In addition, the generated content expression style format can be transmitted to a third party in cooperation with electronic mail.

What is claimed is:

1. An expression style processing method for a portable radio communication terminal which transmits/receives a multimedia content formed from an object having at least character data and image data through a network including a radio data communication network, comprising performing in said radio communication terminal the steps of:

a) receiving a plurality of objects from an internet download using the radio data communication network;
   b) inputting character data using a character input device in said radio communication terminal;
   c) converting the input character data into a descriptive language, said converted character data forming additional objects;
   d) storing the plurality of objects and said additional objects as stored objects;
   e) generating an expression style format for expressing the stored objects; and
   f) storing the generated expression style format.

2. A method according to claim 1, wherein
   said method further comprises the step of sensing an image from within said received plurality of objects, and
   the step of storing a plurality of objects comprises the steps of
   converting the sensed image to digitally processible image data, and
   storing the image data as one of said plurality of objects.

3. A method according to claim 1, wherein
   said method further comprises the step of
   converting the input character to digitally processible character data prior to the converting step c).

4. A method according to claim 1, wherein
   said method further comprises the step of inputting a voice, and
   the step of storing a plurality of objects comprises the steps of
   converting the input voice to digitally processible voice data, and
   storing the voice data as one of the plurality of objects.

5. A method according to claim 1, further comprising the steps of
   selecting and displaying at least one of the stored objects, and
   generating the expression style format by registering the displayed object as an expression style format.

6. A method according to claim 5, wherein the step of generating the expression style format comprises the step of generating the expression style format by defining an order of additional registration of the respective objects as an expression order.

7. A method according to claim 1, further comprising the step of expressing the respective objects on the basis of the stored expression style format to reconstruct operation of the expression style format.

8. A method according to claim 1, further comprising the step of changing expressions of the objects registered in the stored expression style format to correct the expression style format.

9. A method according to claim 8, wherein the expression of each object includes at least one of a display position, display order, and size of the object.

10. A method according to claim 1, wherein
    said method further comprises the step of downloading at least one of character data and a description language through the network, and
    the step of storing a plurality of objects comprises the step of storing at least one of the downloaded character data and description language as one of the plurality of objects.

11. A method according to claim 1, wherein
    said method further comprises the step of downloading image data through the network, and
    the step of storing a plurality of objects comprises the step of storing the downloaded image data as one of the plurality of objects.

12. A method according to claim 1, wherein
    said method further comprises the step of downloading voice data through the network, and
    the step of storing a plurality of objects comprises the step of storing the downloaded voice data as one of the plurality of objects.

13. A method according to claim 1, wherein
said method further comprises the steps of
superposing and displaying a plurality of stored objects each formed from at least one of image data and character data in a single window, and
synthesizing the plurality of superposed and displayed objects to generate a synthesized object, and
the step of storing a plurality of objects comprises the step of storing the synthesized object as a new object.

14. A method according to claim 13, further comprising the step of, after synthesis of superposed and displayed objects, deleting the plurality of objects used for synthesis.

15. A method according to claim 1, wherein:
said received objects includes a description language including a superposition expression of a plurality of objects;
said method further comprises the steps of
g) superposing and displaying the received plurality of objects used in the superposition expression of the downloaded description language in a single window, and
h) synthesizing the objects superposed and displayed to generate a synthesized object, and
i) the step of storing a plurality of objects comprises the step of storing the synthesized object as a new object.

16. A method according to claim 15, further comprising the step of, after step h), deleting the plurality of objects used for synthesis.

17. A portable radio communication terminal for transmitting/receiving a multimedia content formed from an object having at least character data and image data through a network including a radio data communication network, comprising:
means for downloading from an internet network a plurality of objects;
a character data input device for inputting character data;
means for converting the input character data into a descriptive language, said converted character data forming additional objects;
first memory means for storing a plurality of objects and the additional objects as stored objects;
expression style format generation means for generating an expression style format for expressing the stored objects in said first memory means; and
second memory means for storing the expression style format output from said expression style format generation means.

18. A terminal according to claim 17, wherein
said terminal further comprises
image input means for sensing an image from within said received plurality of objects, and
image processing means for converting the sensed image from said image input means to digitally processible image data, and
said first memory means comprises an image memory for storing the digitally processible image data from said image processing means as one of said plurality of objects.

19. A terminal according to claim 17, wherein
said first memory means comprises a description language memory for storing the additional objects.

20. A terminal according to claim 17, wherein
said terminal further comprises
voice input means for inputting a voice and generating voice signals, and
voice processing means for converting the voice signals from said voice input means to digitally processible voice data, and
said first memory means comprises a voice data memory for storing the voice data output from said voice processing means as one of said plurality of objects.

21. A terminal according to claim 17, wherein
said terminal further comprises expression processing means for selecting and expressing at least one of the stored objects in said first memory means, and
said expression style format generation means generates the expression style format by registering at least one of said stored objects as an expression style format.

22. A terminal according to claim 21, wherein said expression style format generation means generates the expression style format by defining an order of additional registration of the respective objects as an expression order.

23. A terminal according to claim 17, further comprising expression processing means for expressing the respective objects on the basis of the expression style format stored in said second memory means to reconstruct operation of the expression style format.

24. A terminal according to claim 17, further comprising expression style format correction means for changing expressions of the objects registered in the expression style format stored in said second memory means to correct the expression style format.

25. A terminal according to claim 24, wherein the expression of each object includes at least one of a display position, display order, and size of the object.

26. A terminal according to claim 17, wherein
said terminal further comprises download processing means for downloading at least one of character data and a description language through the network, and
said first memory means comprises a description language memory for storing at least one of the character data and description language downloaded by said download processing means as one of said plurality of objects.

27. A terminal according to claim 17, wherein
said terminal further comprises download processing means for downloading image data through the network, and
said first memory means comprises an image memory for storing the image data downloaded by said download processing means as one of said plurality of objects.

28. A terminal according to claim 17, wherein
said terminal further comprises download processing means for downloading voice data through the network, and
said first memory means comprises a voice data memory for storing the voice data downloaded by said download processing means as one of said plurality of objects.

29. A terminal according to claim 17, wherein
said terminal further comprises display processing means for superposing and displaying a plurality of objects each formed from at least one of image data and character data in a single window, and synthesizing the plurality of objects superposed and displayed to generate a synthesized object, and said first memory means storing said synthesized object as a new object.

30. A terminal according to claim 29, wherein after synthesis of the synthesized object, said display processing means deletes the plurality of objects used for synthesis.

31. A terminal according to claim 17, wherein said means for downloading includes means for downloading a description language including a superposition expression of said plurality of objects through the network, and said terminal further comprises:

display processing means for superposing and displaying the plurality of objects used in the superposition expression of the downloaded description language downloaded by said means for downloading in a single window, and synthesizing the plurality of objects superposed and displayed to generate a superposed object, and said first memory means comprises a memory for storing the superposed object a new object.

32. A terminal according to claim 31, wherein after storing said superposed object, said display procession means deletes the plurality of objects used for superposion.

* * * * *